July 3, 1962 G. L. CLAPPER 3,042,811

SYNCHRONIZED GATED TRANSISTOR TRIGGER CIRCUIT

Filed May 29, 1958

INVENTOR
GENUNG L. CLAPPER

BY

G. R. Gugger

AGENT 3,042,811

SYNCHRONIZED GATED TRANSISTOR TRIGGER CIRCUIT

Genung L. Clapper, Vestal, N.Y., assignor to International Business Machines Corporation, New York, N.Y., a corporation of New York Filed May 29, 1958, Ser. No. 738,773
3 Claims. (Cl. 307—88.5)

This invention relates to trigger circuits and more particularly to a transistor trigger circuit employing a gated input.

Briefly, the basic transistor comprises a small block of semiconductor material to which are applied at least three electrodes, termed base, collector, and emitter, respectively. The semiconductor material may be of either n-type (indicating that the charges in the material normally available for carrying current are negative, i.e., electrons) or p-type (indicating that the charges in the material normally available for carrying current are positive, i.e., "holes"). It has been found that silicon and germanium, and particularly the latter, are suitable semiconductor materials. In the original point contact, or "Type A" transistor, and the fieldistor, the body block is composed of only one type of semiconductor material before surface treatment, and in the case of germanium, the type usually employed is n-type. In the case of the junction transistor, the body block is composed of three or more layers of alternately n- and p-type semiconductor material (usually germanium) and the contacts are of the ohmic type, rather than being point contacts. When potentials are properly applied between the base and each of the other two electrodes, a translating device is produced wherein variations in current in the collector-base or output circuit are produced by variations in current in the emitter-base or input circuit.

In many applications it becomes necessary to make use of asynchronous pulses or pulses which have an unpredicted occurrence and in the course of such use the asynchronous pulses have to be retimed or gated so that predicted outputs may be obtained. For example, when an asynchronous gate pulse is used to gate a device such as a trigger circuit which is operated from synchronous clock pulses, certain critical timing conditions may exist and it is desirable to retime the gate so that these critical times are avoided without creating undue delay and so that predicted operation of the trigger may be expected.

Accordingly, a principal feature of the present invention is to provide a trigger which is gated in a novel manner to provide a synchronized output even though asynchronous signals are applied to the input.

Another feature of the present invention is to provide a trigger operated from synchronous clock pulses and asynchronous gate pulses and having novel gating means for gating the asynchronous pulses so that there is no output from the gate between clock pulses.

A still further feature of the present invention is to provide a trigger having novel input gating means whereby the trigger is conditioned first and then triggered, resulting in an extremely fast triggering action.

Other features of the present invention will be pointed out in the following description and claims and illustrated in the accompanying drawings which disclose, by way of example, the principle of the invention and the best mode which has been contemplated of applying that principle.

Figure 1:
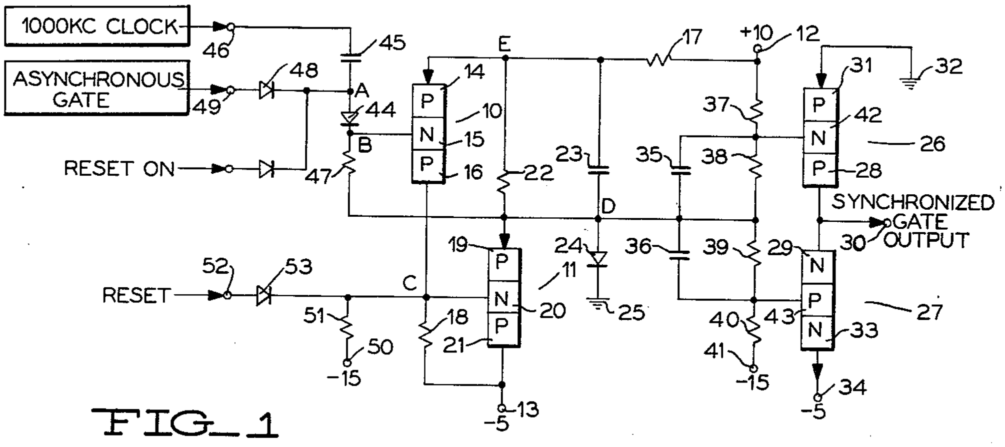
FIG. 1 shows a preferred embodiment of a gated transistor circuit in accordance with the present invention.

Referring to FIG. 1, the trigger comprises a pair of PNP junction type transistors 10 and 11 arranged in parallel between a positive 10 volt terminal 12 and a negative 5 volt terminal 13. Transistor 10 has an emitter electrode 14, a base electrode 15 and a collector electrode 16 with the emitter electrode connected to the 10 volt terminal 12 through a resistor 17 and the collector electrode connected to the negative 5 volt terminal 13 through a resistor 18. The transistor 11 has an emitter electrode 19, a base electrode 20 and a collector electrode 21 with the emitter electrode connected to the 10 volt terminal 12 through resistors 22 and 17, and the collector electrode connected directly to the negative 5 volt terminal 13. The collector electrode 16 of transistor 10 is also connected to the base electrode 20 of transistor 11.

Arranged in parallel with the transistors 10, 11, are a bypass capacitor 23 and a clamping diode 24 which is connected to a ground terminal 25 to clamp the trigger output at point D at ground or 0 potential. The trigger output at D is fed into a complementary inverter driver comprising a PNP type transistor 26 and an NPN type transistor 27 having their respective collector electrodes 28, 29 connected to an output terminal 30. The emitter electrode 31 of transistor 26 is shown connected to a ground terminal 32 and the emitter electrode 33 of transistor 27 is shown connected to a negative 5 volt terminal 34. Capacitors 35, 36 and resistors 37, 38, 39 and 40, connected between the positive 10 volt terminal 12 and a negative 15 volt terminal 41, form a dual divider which sets the voltages at the base electrodes 42, 43. In the static or no signal condition, point D is at ground potential and the base N zone of transistor 26 is at the same potential as its emitter zone and no current flows through the transistor. However, the base P zone of transistor 27 is positive with respect to its emitter zone causing current to flow in transistor 27 and placing the output potential at a negative 5 volts as shown on FIG. 2.

The input gate is shown connected to the base N zone of transistor 10 and comprises a diode 44 and capacitor 45 connected in series with a clock or synchronous pulse input terminal 46, with the cathode of the diode 44 connected to the base N zone of transistor 10 and also connected, through a resistor 47, to the emitter electrode 19 of transistor 11, the plate of clamping diode 24 and the complementary inverter driver. A second diode 48 is connected in series between the plate of diode 44 and an asychronous gate pulse input terminal 49.

The base N zone of transistor 11 is connected to a negative 15 volt terminal 50 through a resistor 51 and to a reset pulse input terminal 52 through a diode 53.

Figure 2:
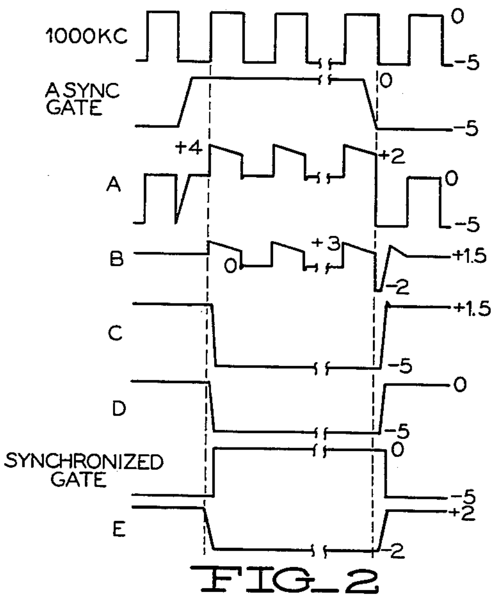
FIG. 2 is a group of signal waveforms appearing at various points in the circuit of FIG. 1.

Referring to FIG. 2, during the absence of an input gate pulse from terminal 49, the potential at point E is approximately a positive 2 volts and the potential at point B is at a positive 1.5 volts thus establishing the emitter 14 positive with respect to the base 15 which places transistor 10 in a state of conduction. The resulting rise in potential at point C to 1.5 volts renders base 20 positive with respect to the emitter 19, which is at 0 volts, and transistor 11 is in a state of nonconduction. The trigger under these conditions is in the "off" state and has a potential of negative 5 volts at its output terminal 30.

The application of the megacycle clock pulses to the input gate during the absence of a gate pulse will have no effect on the trigger. The upswing of the clock pulse is reflected through capacitor 45 to raise the potential at point A to 0 volts; however, with point B at a positive 1.5 volts, the diode 44 remains in a reverse biased condition and transistor 10 continues to conduct.

If an asynchronous gate pulse occurs at terminal 49 coincident with the duration of a clock pulse, the trigger will still remain unaffected since the clock pulse drove point A to 0 potential and the 5 volt upswing of the gate pulse to 0 potential is insufficient to bring about current flow in the diode 48. Consequently, point B remains at a positive 1.5 volt potential and transistor 10 continues to conduct. However, should the gate pulse occur in between clock pulses, an action follows which, in effect, sets or conditions the trigger for operation upon the occurence of the next clock pulse.

In between clock pulses the potential at point A is at a negative 5 volts and the gate pulse upswing at terminal 49 to 0 volts biases diode 48 in the forward direction and current flows to pull the potential at point A up to 0 volts. The 5 volt upward shift of the next incoming clock pulse will now raise the potential at point A to approximately a positive 4 volts, allowing for a volt drop across capacitor 45. The potential at A now biases diode 44 in a forward direction resulting in current flow which raises the potential at point B to a positive 3 volts which is sufficient to reverse bias the emitter-base diode of transistor 10 and cut off this transistor. With transistor 10 cut off, the potential at point C drops to a negative 5 volts which biases the emitter-base diode of transistor 11 in the forward direction to drive this transistor into conduction and turn the trigger "on."

With transistor 11 conducting, the potential at point D will drop to a negative 5 volts and this is applied to the complementary inverter driver causing transistor 27 to cut off and transistor 26 to conduct whereby a 5 volt positive-going pulse is produced at the output terminal 30 of the trigger. The potential at point E now drops to a negative 2 volts insuring the cutoff of transistor 10 and maintaining the trigger stable until termination of the gate pulse. It will be noted that the clock pulses occurring during the gate pulse duration will cause the potential at points A and B to fluctuate; however, the trigger remains unaffected due to the negative 2 volt bias on the emitter 14 of transistor 10.

The trigger will flip back to the "off" state on the next clock pulse downswing following termination of the gate pulse. When the clock shift down occurs, the potential at point A will drop to a negative 5 volts, current ceases to flow in diode 44 and the potential at point B drops until it reaches a negative 2 volts whereupon transistor 10 is set into conduction. As a result, the potential at points B and C is restored to a positive 1.5 volts and transistor 11 is cut off. The upswing in potential at point D is clamped at 0 volts by the diode 24 and conduction of transistor 27 returns the potential at output terminal 30 back to a negative 5 volts.

It can be readily understood that with the present circuit, the trigger can only be flipped on by the upswinging clock pulse and is prevented from coming on in between clock pulses thereby producing a predictable or synchronized gate output pulse from an asynchronous gate input pulse. The fact that the asynchronous gate pulse must appear first followed by a clock pulse in order to operate the trigger, there is produced, in effect, a sequential "and" circuit. The preconditioning of the trigger by the gate pulse makes possible a fast acting trigger which can be operated from one megacycle clock pulses.

It should be pointed out that, in effect, without the input gate, the present circuit is not a trigger because unless point A is held at ground potential transistor 10, if cut off, will not remain cut off. This is due to the negative 2 volt potential at point E which is not low enough to keep transistor 10 cut off unless point B is near ground. Hence, the trigger has the advantage of not being operable from spurious noise or other outside transient signals. It may also be pointed out that for lower clock frequencies, the termination of the gate pulse alone is sufficient to turn the trigger off giving the gate full control. The present gate is, of course, applicable to trigger circuits other than the one shown.

Figure 4:
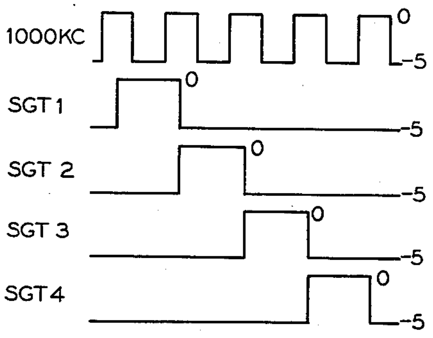
FIG. 4 is a group of signal waveforms illustrating the operation of the circuit of FIG. 3.
Figure 3:
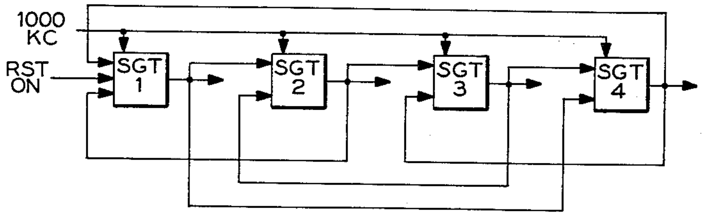
FIG. 3 illustrates the use of the present invention in a high speed ring circuit.

FIGS. 3 and 4 illustrate the use of the present circuit in a high speed ring. The first synchronized gate trigger SGT1 may be reset "on" so that it becomes a gate for the second trigger SGT2 which will then turn "on" at the next clock pulse. As each trigger turns "on," it turns "off" the preceding one and conditions the next following one. The ring may be operated "open-ended," in which case, the first trigger must be turned "on" for each operation. If the "turn off" feedback is removed, successive gates will be produced.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A gated trigger circuit which comprises a transistor having emitter, collector and base electrodes, means normally biasing said transistor into one of two stable states, a source of asynchronous pulses, a source of synchronized clock pulses, gating means connected to the base electrode of said transistor, said gating means responsive to an asynchronous pulse to condition said transistor for a transfer to the other of said stable states, and responsive to the next succeeding clock pulse to effect the transfer of said conditioned transistor to produce a synchronized output pulse, latching means controlled by said transistor for latching said transistor in its transferred state, said gating means being responsive to the first downswing of a clock pulse following termination of said asynchronous pulse to offset said latching means and effect transfer of said transistor back to its original state, and means for developing a potential at said base electrode whose level is adjusted in accordance with the state of said trigger circuit to preset said transistor for a transfer from said one state to said other state and also from said other state back to its original state.

2. A gated trigger circuit which comprises a transistor having emitter, collector and base electrodes, means normally biasing said transistor into one of two stable states, a source of asynchronous pulses, a source of synchronized clock pulses, gating means connected to the base electrode of said transistor, means responsive to the occurrence of an asynchronous pulse for adjusting said gating means to condition said transistor for a transfer to the other of said stable states, means responsive to the next succeeding clock pulse following adjustment of said gating means for effecting further adjustment of said gating means whereby a shift in potential occurs at said base electrode causing said transistor to transfer to said other stable state to produce a synchronized output pulse, circuit means controlled by said transistor for developing a potential at said emitter electrode to latch said transistor in its transferred state, said gating means being responsive to the first downswing of a clock pulse following termination of said asynchronous pulse to offset said emitter potential and effect transfer of said transistor back to its original state, and impedance means in circuit with said base electrode and controlled by said trigger circuit for adjusting the potential at said base electrode to enhance the transfer of said transistor between its stable states.

3. A gated trigger circuit which comprises a transistor having emitter, collector and base electrodes, means normally biasing said transistor into one of two stable states, a source of asynchronous pulses, a source of synchronized clock pulses, a first diode connected to said base electrode, a second diode connected in series between said asynchronous pulse source and said first diode, said second diode responsive to an asynchronous pulse to adjust said first diode and condition said transistor for a transfer to the other of said stable states, a capacitor connected in series between said first diode and said synchronized clock pulse source, said capacitor responsive to the next succeeding clock pulse occurring during the duration of said asynchronous pulse to effect a further adjustment of said first diode whereby said transistor transfers to said other stable state and produces a synchronized output pulse, a second transistor having emitter, collector and base electrodes, connections between said transistors whereby they assume opposite states of conductivity, circuit means connecting the emitters of said transistors whereby a potential is developed at the emitter of said first transistor to latch same in its transferred state, said capacitor and first diode being responsive to the first downswing of a clock pulse following termination of said asynchronous pulse to overcome said latch and effect transfer of said first transistor back to its original state, and a resistor connected between the base of said first transistor and the emitter of said second transistor for producing a floating potential which is a function of the trigger.

References Cited in the file of this patent

UNITED STATES PATENTS

| | | |
|---|---|---|
| 2,685,039 | Scarbrough et al. | July 27, 1954 |
| 2,757,286 | Wanlass | July 31, 1956 |
| 2,851,604 | Clapper | Sept. 9, 1958 |
| 2,864,007 | Clapper | Dec. 9, 1958 |
| 2,885,573 | Clapper | May 5, 1959 |

FOREIGN PATENTS

| | | |
|---|---|---|
| 162,722 | Australia | May 5, 1955 |